United States Patent [19]
Jung

[11] Patent Number: 5,994,803
[45] Date of Patent: Nov. 30, 1999

[54] BRUSHLESS DC MOTOR

[75] Inventor: Sung Cheon Jung, Seoul, Rep. of Korea

[73] Assignee: Samsung Electro-Mechanics Co. Ltd., Suwon, Rep. of Korea

[21] Appl. No.: 08/992,370

[22] Filed: Dec. 17, 1997

[30] Foreign Application Priority Data

Aug. 26, 1997 [KR] Rep. of Korea ............... 97-40904
Aug. 26, 1997 [KR] Rep. of Korea ............... 97-40908

[51] Int. Cl.⁶ ............... H02K 5/24; H02K 5/16; F16C 32/06
[52] U.S. Cl. ............... 310/51; 310/90; 310/90.5; 310/67 R; 384/114
[58] Field of Search ............... 310/51, 67 R, 310/90, 90.5, 91, 68 B; 360/98.07, 99.04, 99.08; 384/100, 114, 446

[56] References Cited

U.S. PATENT DOCUMENTS

| | | | |
|---|---|---|---|
| 3,934,950 | 1/1976 | Kuhlmann | 310/90.5 |
| 4,726,640 | 2/1988 | Iwama et al. | 310/90.5 |
| 5,032,751 | 7/1991 | Morita | 310/90.5 |
| 5,069,515 | 12/1991 | Itami et al. | 310/90 |
| 5,181,783 | 1/1993 | Sherman et al. | 384/114 |
| 5,223,758 | 6/1993 | Kataoka et al. | 310/90 |
| 5,471,104 | 11/1995 | Toshimitsu et al. | 310/90 |
| 5,659,445 | 8/1997 | Yoshida et al. | 310/90 |
| 5,686,772 | 11/1997 | Delamare et al. | 310/90.5 |
| 5,834,867 | 11/1998 | Kikuchi et al. | 310/51 |
| 5,835,124 | 11/1998 | Fukita et al. | 310/90 |
| 5,872,409 | 2/1999 | Jung | 310/51 |

Primary Examiner—Clayton LaBalle
Attorney, Agent, or Firm—Ladas & Parry

[57] ABSTRACT

A brushless DC motor is disclosed. In the motor, an axial vibration limit unit is provided on a bearing and electromagnetically attracts a rotor, thus preventing the rotor from being centrifugally lifted during a high speed rotation of the rotor. In the operation of the motor, an axial displacement of the rotor is sensed by an induction coil of a sensor. The induction coil generates a variable induction current indicative of an axial displacement of the rotor, and outputs the current to a controller through an amplifier, thus controlling the vibration limit unit. The electromagnetic bearing of this invention thus supports the shaft and rotor in an axial direction and almost completely prevents any axial vibrations of the rotor, thereby reducing operational vibrations and noises and improving the axial dynamic characteristics of the brushless DC motor.

20 Claims, 5 Drawing Sheets

BRUSHLESS DC MOTOR

BACKGROUND OF THE INVENTION

1. Field of the Invention

The present invention relates, in general, to brushless DC motors and, more particularly, to a brushless DC motor with a rotor, the rotor being coupled to a hydrodynamically supported shaft and being free from any axial vibrations during a high speed operation of the motor, thus effectively reducing operational vibrations and noises.

2. Description of the Prior Art

As well known to those skilled in the art, small-sized precision motors, typically used in office machines, are required to be designed to rotate at high speeds and provide dynamic characteristics of low operational vibrations and noises in order to meet the necessity of high speed operation and provide a large capacity of such office machines. Therefore, it is a recent trend to change bearings for such motors from ball bearings into hydrosintered or hydrodynamic bearings with excellent dynamic characteristics.

FIG. 1 is a sectional view of a spindle motor using a conventional hydrodynamic bearing. As shown in the drawing, a sleeve 1a is vertically and concentrically arranged on the base panel of a motor housing 1 through a fitting process, while a shaft 2 is rotatably and downwardly inserted into the sleeve 1a. A core 1b, with a coil 1c, is arranged around the sleeve 1a, thus forming a stator of the motor. The top end of the shaft 2 is coupled to a cap-shaped rotor 3, thus being rotatable along with the rotor 3. A cylindrical magnet 3a is attached to the inner surface of the rotor's sidewall, thus surrounding the core 1b. When the motor is started, electric power is applied to the coil 1c of the core 1b, thus allowing the magnet 3a to generate magnetic force. The rotor 3 is thus rotated along with the shaft 2 at high speeds.

In the above spindle motor, the hydrodynamic bearing comprises a plurality of dynamic pressure grooves 2a, which are formed on the shaft 2 and are filled with oil. When the shaft 2 is rotated inside the sleeve 1a at high speeds, oil, filled in the gap between the sleeve 1a and the shaft 2, generates a hydrodynamic pressure at the grooves 2a and effectively supports the shaft 2 in a radial direction during a high speed rotation of the shaft 2. When the shaft 2 is rotated at high speeds as described above, the rotor 3, carrying a disc (not shown) thereon, is rotated at high speeds, thus allowing data stored on the disc to be reproduced.

However, such a conventional hydrodynamic bearing for spindle motors is problematic in that it fails to support the shaft 2 in an axial direction and only supports the shaft 2 in a radial direction. Therefore, another bearing has to be provided in the motor for supporting the shaft 2 in an axial direction even though it is very difficult to produce the radial support hydrodynamic bearing and the axial support bearing and precisely set the two bearings in the motor.

In an effort to overcome the above problems experienced in the above spindle motors, Japanese Patent Laid-open Publication No. Hei. 7-110,028 and Japanese Laid-open Publication No. Sho. 56-20,828 individually disclose a technology of limiting axial vibrations of a rotor in motors. In each of the above Japanese patents, the shaft of a motor is axially supported by a washer-type structure capable of forming a hydrodynamic pressure on the shaft in an axial direction using elastic liquid. However, the above Japanese technologies have a problem in that such a washer-type structure complicates the production process of motors and remarkably increases production cost, thus being less likely to be produced in commercial quantity. Another problem of the above Japanese technologies is that the washer-type structure only provides low axial dynamic characteristics for the shaft, thus failing to radically remove axial vibrations of the shaft and rotor.

SUMMARY OF THE INVENTION

Accordingly, the present invention has been made keeping in mind the above problems occurring in the prior art, and an object of the present invention is to provide a brushless DC motor, which has an electromagnetic bearing for supporting the shaft and rotor in an axial direction, thus almost completely preventing any axial vibrations of the rotor during a rotation of the rotor, and of which the axial dynamic characteristics are improved by the electromagnetic bearing, thus effectively reducing operational vibrations and noises of the motor and improving work efficiency and productivity while producing such motors.

In order to accomplish the above object, the brushless DC motor according to the primary embodiment of the present invention comprises: a stator with a coil; a rotatable shaft acting as a rotating shaft of the motor; a rotor, comprising: a cylindrical sidewall portion coaxially coupled to the shaft and coaxially surrounding the stator; a rotor holder coaxially coupling the cylindrical sidewall portion to the top end portion of the shaft; a magnet attached to the inner surface of the cylindrical sidewall portion and positioned around the stator while forming an air gap between the stator and the magnet; and a first magnetic force generator provided on the lower portion of the rotor holder; a base panel used as a holding panel for the stator; a bearing system, comprising: an inner wall interiorly and rotatably holding the shaft with an oil gap being defined between the shaft and the inner wall; an outer wall surrounding the inner wall and being used as a holding surface of the bearing system; a second magnetic force generator provided at a position approximate to the rotor holder and cooperating with the first magnetic force generator of the rotor, thus forming a magnetic force; a sensor used for sensing a variable magnetic force generated by the first and second magnetic force generators; at least one vibration limit unit adapted for selectively generating an electromagnetic force so as to prevent the rotor from axially moving during a rotation of the rotor, the vibration limit unit being positioned at an intermediate portion between the inner and outer walls; and top and bottom walls integrating the inner and outer walls into a single structure at the top and bottom ends of the inner and outer walls; and a controller adapted for controlling the limit unit in response to a signal output from the sensor of the bearing system.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
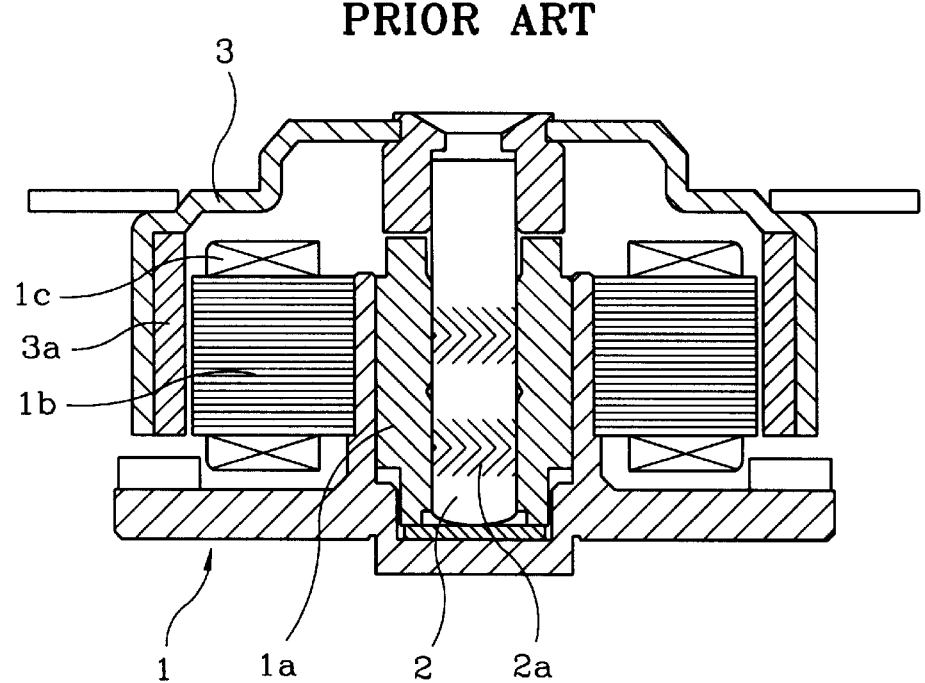
FIG. 1 is a sectional view of a spindle motor using a conventional hydrodynamic bearing for supporting a shaft in a radial direction.
Figure 2:
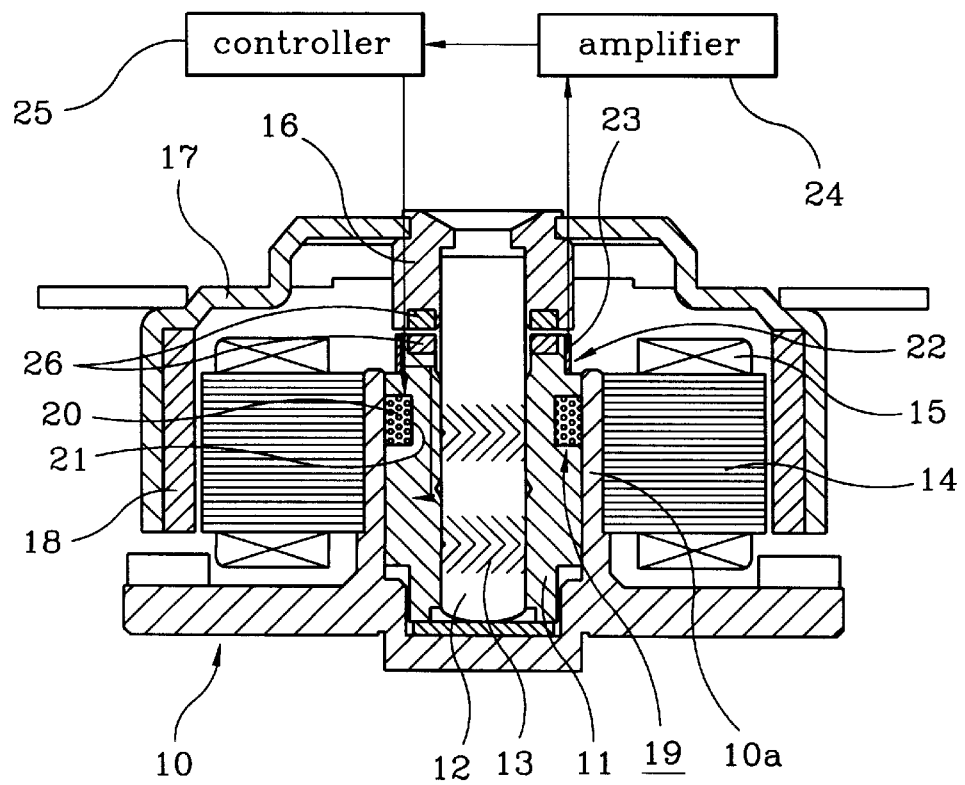
FIG. 2 is a sectional view of a brushless DC motor using an electromagnetic bearing in accordance with the primary embodiment of the present invention.

FIG. 2 is a sectional view of a brushless DC motor using an electromagnetic bearing in accordance with the primary embodiment of the present invention. As shown in the drawing, the motor has a base panel 10 with a cylindrical holder 10a. The holder 10a is vertically formed at the center of the panel 10a and holds a bearing 11, which forms a bearing system of the motor. A stator 14, with a coil 15, is arranged around the holder 10a of the base panel 10.

The bearing 11 has an inner wall and an outer wall. The inner wall of the bearing 11 has a predetermined inner diameter suitable for receiving and rotatably holding a shaft 12, while the outer wall is fitted into the cylindrical holder 10a. The inner and outer walls of the bearing 11 are integrated into a single structure at their top and bottom ends by top and bottom walls. Oil is filled in the gap between the shaft 12 and the inner wall of the bearing 11. The shaft 12 is provided with a plurality of dynamic pressure grooves 13 at its outer surface. When the shaft 12 is rotated inside the bearing 11 at high speeds, oil, filled in the gap between the bearing 11 and the shaft 12, generates a hydrodynamic pressure at the grooves 13 and effectively supports the shaft 12 in a radial direction during the high speed rotation of the shaft 12.

A rotor holder 16 is tightly fitted over the top end portion of the shaft 12, thus being rotatable along with the shaft 12. A rotor 17 is concentrically fitted over the rotor holder 16, thus being rotatable along with the rotor holder 16. The rotor 17 is opened downwardly and has a cylindrical sidewall which surrounds the stator 14. A cylindrical magnet 18 is attached to the inner surface of the rotor's sidewall with an air gap being formed between the stator 14 and the magnet member 18. When the motor is started, electric power is applied to the coil 15 of the stator 14, thus allowing the magnet 18 to generate magnetic force. The rotor 17 is thus rotated along with the shaft 12 at high speeds.

Figure 3:
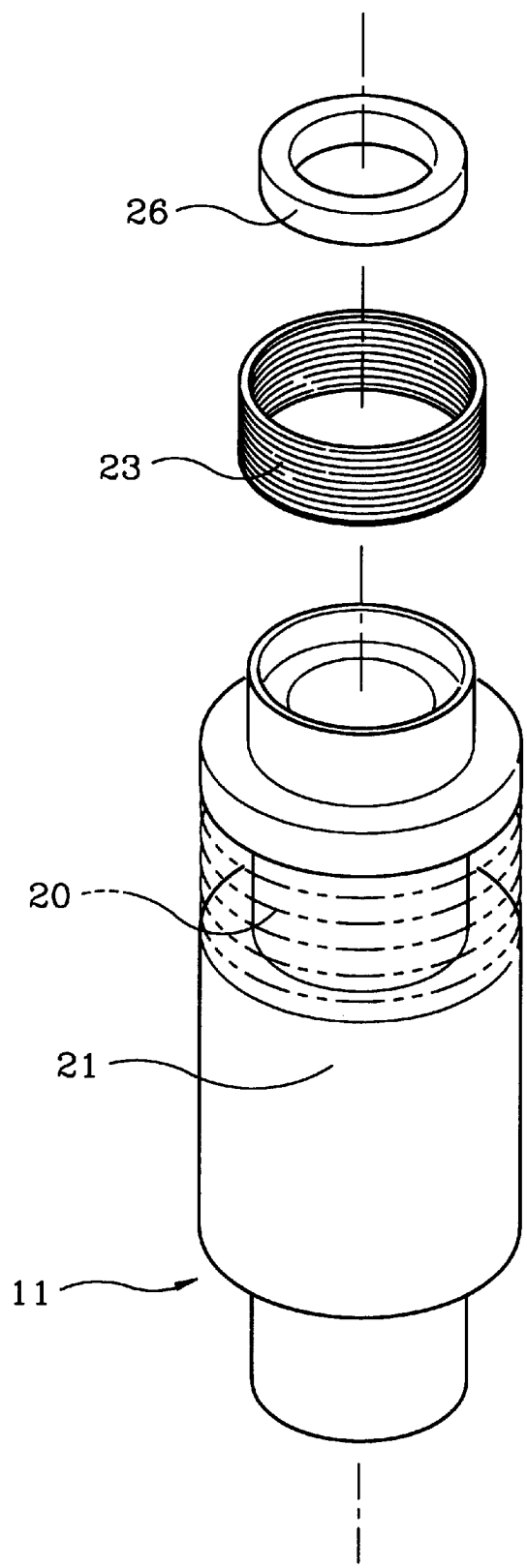
FIG. 3 is an exploded perspective view showing the construction of an axial vibration limit unit included in the motor of FIG. 2.

The brushless DC motor of this invention also has an axial vibration limit unit 19, which is provided at an intermediate portion between the inner and outer walls of the bearing 11 and is used for preventing the rotor 17 from being axially vibrated while the rotor 17 is rotated. That is, the above vibration limit unit 19 prevents the rotor 17 from centrifugally moving upwardly while the shaft 12 is rotated at high speeds. The above unit 19 utilizes an electromagnetic theory. In order to form the vibration limit unit 19, the bearing 11 is provided with a groove 21 on its outer wall for carrying an electromagnetic coil 20 as shown in FIG. 3. Due to the electromagnetic coil 20, the top portion of the bearing 11 selectively becomes an electromagnet and attracts the rotor 17 to the bearing 11, thus preventing the rotor 17 from being centrifugally lifted while the rotor 17 is rotated along with the shaft 12 at high speeds.

An axial displacement sensor 22 is provided on the outer surface of the bearing's top portion for sensing an axial displacement of the rotor 17. When the above sensor 22 senses an axial displacement of the rotor 17 larger than a reference value, the sensor 22 turns on the electromagnetic coil 20. In the embodiment of this invention, an induction coil 23 is used in the displacement sensor 22. In order to improve the sensing operational effect of the induction coil 23, first and second magnetic force generators 26 are provided on the bottom surface of the rotor holder 16 and the top surface of the bearing 11, respectively. The magnetic force of the two generators 26 varies in accordance with the distance between the two generators 26 and the variable magnetic force is precisely sensed by the induction coil 23 of the sensor 22. The variable induction current of the induction coil 23 is amplified by an amplifier 24 prior to being applied to a controller 25, thus allowing the vibration limit unit 19 to be operated under the control of the controller 25.

In a brief description, the motor of this invention has an axial vibration limit unit 19, which is positioned at the intermediate portion between the inner and outer walls of the bearing 11 and is used for electromagnetically attracting the rotor 17, thus preventing the rotor 17 from being centrifugally lifted while the rotor 17 is rotated. In order to form the vibration limit unit 19, the electromagnetic coil 20 is wound around the groove 21 of the bearing 11. In the operation of the vibration limit unit 19, the displacement sensor 22 senses an axial displacement of the rotor 17 prior to starting the vibration limit unit 19. The above sensor 22 includes the induction coil 23, which is wound around the outer surface of the bearing top portion. In the present invention, it is preferable to use op-amp analog PID controller or a LEAD/PHASE LAG compensator in the motor. The induction coil 23 generates an induction current in accordance with an axial displacement of the rotor 17 prior to applying the induction current to both the amplifier 24 and the controller 25, thus allowing the controller 25 to appropriately control the vibration limit unit 19.

The above vibration limit unit 19 applies electric current to the electromagnetic coil 20 in response to a control signal output from the controller 25. Upon receiving the control signal, the electromagnetic coil 20 makes the top portion of the bearing 11 become an electromagnet. The rotor holder 16 is magnetically attracted by the bearing 11, thus preventing the rotor 17 from being centrifugally lifted during a high speed rotation of the rotor 17. The vibration limit unit 19 thus effectively reduces operational vibrations and noises during the operation of the brushless DC motor.

Figure 4:
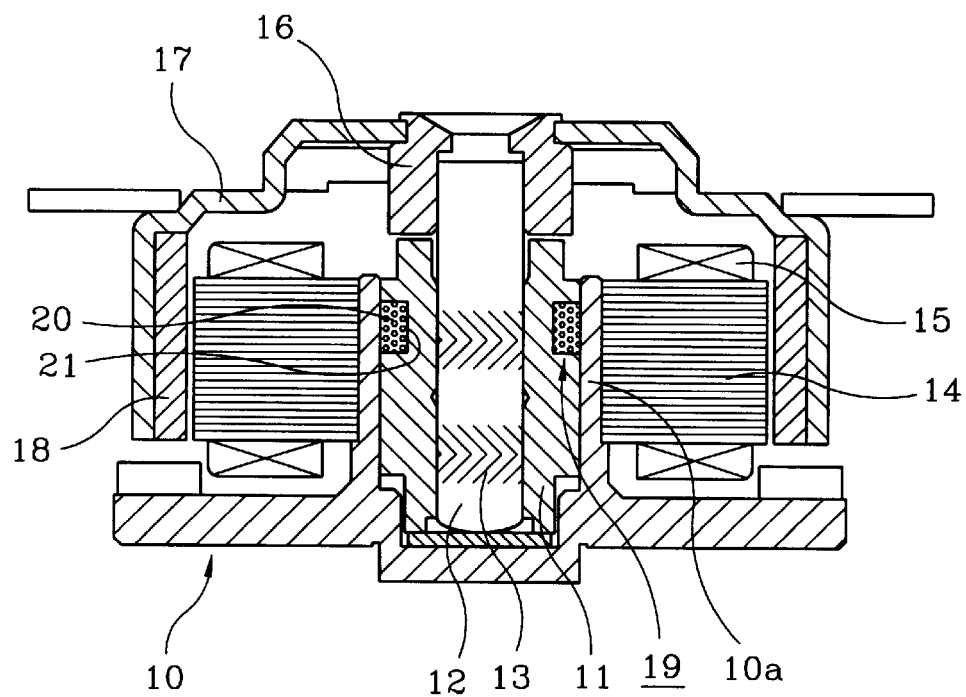
FIG. 4 is a sectional view of a brushless DC motor using an electromagnetic bearing in accordance with the second embodiment of the present invention.

FIG. 4 is a sectional view of a brushless DC motor using an electromagnetic bearing in accordance with the second embodiment of this invention. In the second embodiment, the general shape of the motor remains the same as in the primary embodiment, but the motor of the second embodiment does not have any axial displacement sensors 22 or any magnetic force generators 26 as in the primary embodiment. In the operation of the motor according to the second embodiment, a vibration limit unit 19 is turned on when the shaft 12 along with the rotor 17 is rotated at high speeds. Therefore, both the shaft 12 and the rotor 17 are attracted by a constant electromagnetic force. Of course, when the shaft 12 is stopped, the vibration limit unit 19 is turned off, thus making the rotor 17 free from such an electromagnetic force.

Figure 5:
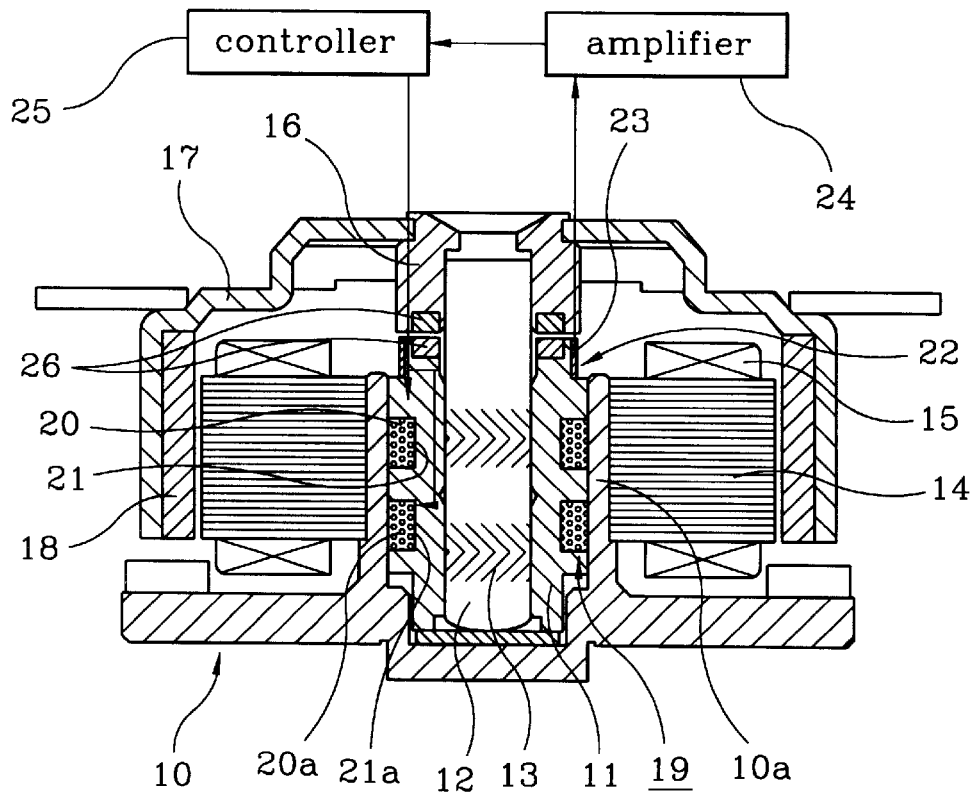
FIG. 5 is a sectional view of a brushless DC motor using an electromagnetic bearing in accordance with the third embodiment of the present invention.

FIG. 5 is a sectional view of a brushless DC motor using an electromagnetic bearing in accordance with the third embodiment of this invention. In the third embodiment, most of the elements are common with those of the primary embodiment. Those elements common to both the primary and third embodiments will thus carry the same reference numerals. In the motor according to the third embodiment, an axial vibration limit unit 19 is provided on the bearing 11 for electromagnetically attracting the rotor 17 and so the rotor 17 is prevented from being centrifugally lifted during a high speed rotation of the rotor 17. Different from the primary and second embodiments, the vibration limit unit 19 according to the third embodiment comprises two electromagnetic coils, that is, upper and lower electromagnetic coils 20 and 20a, which are respectively wound around upper and lower grooves 21 and 21a of the bearing 11.

The upper coil 20 is selectively operated when the rotor 17 is centrifugally lifted. In such a case, the upper coil 20 makes the upper portion of the bearing 11 become an electromagnet capable of magnetically and downwardly attracting the rotor holder 16. Therefore, the upper coil 20 prevents a centrifugal upward movement of the rotor 17. Meanwhile, the lower coil 20a generates a magnetic flux in a direction which is opposite to that of the magnetic flux generated by the upper coil 20. The lower coil 20a thus regulates the magnetic force of the upper coil 20.

In the third embodiment, the axial vibration limit unit 19 electromagnetically attracts the rotor 17, thus preventing the rotor 17 from being centrifugally lifted during a high speed rotation of the rotor 17. In the axial vibration limit unit 19, the upper electromagnetic coil 20 is wound around the upper groove 21 of the bearing 11, while an axial displacement of the rotor 17 is sensed by a displacement sensor 22. The sensor 22 is comprised of an induction coil 23, which is wound around the upper portion of the bearing 11 and generates an induction current in accordance with an axial displacement of the rotor 17. The induction current of the induction coil 23 is amplified by an amplifier 24 prior to being applied to a controller 25, thus allowing the vibration limit unit 19 to be operated under the control of the controller 25.

The upper coil 20 is selectively turned on in response to a control signal output from the controller 25. In such a case, the upper coil 20 makes the upper portion of the bearing 11 become an electromagnet capable of magnetically and downwardly attracting the rotor holder 16 along with the rotor 17. Therefore, the upper coil 20 prevents a centrifugal upward movement of the rotor 17. The electromagnetic force of the upper coil 20 is regulated by the lower coil 20a. That is, when the electromagnetic force, which is generated from the upper portion of the bearing 11 by the upper coil 20, exceeds a reference level, the lower coil 20a is turned on in order to regulate the upper coil 20. In such a case, the lower coil 20a generates a magnetic flux in a direction which is opposite that of the magnetic flux generated by the upper coil 20. The shaft 12 is thus controlled, thereby allowing the rotor 17 to be free from being exceedingly attracted by the electromagnet of the bearing 11. Therefore, it is possible to effectively reduce operational vibrations and noises of the motor during a high speed operation of the motor.

Figure 6:
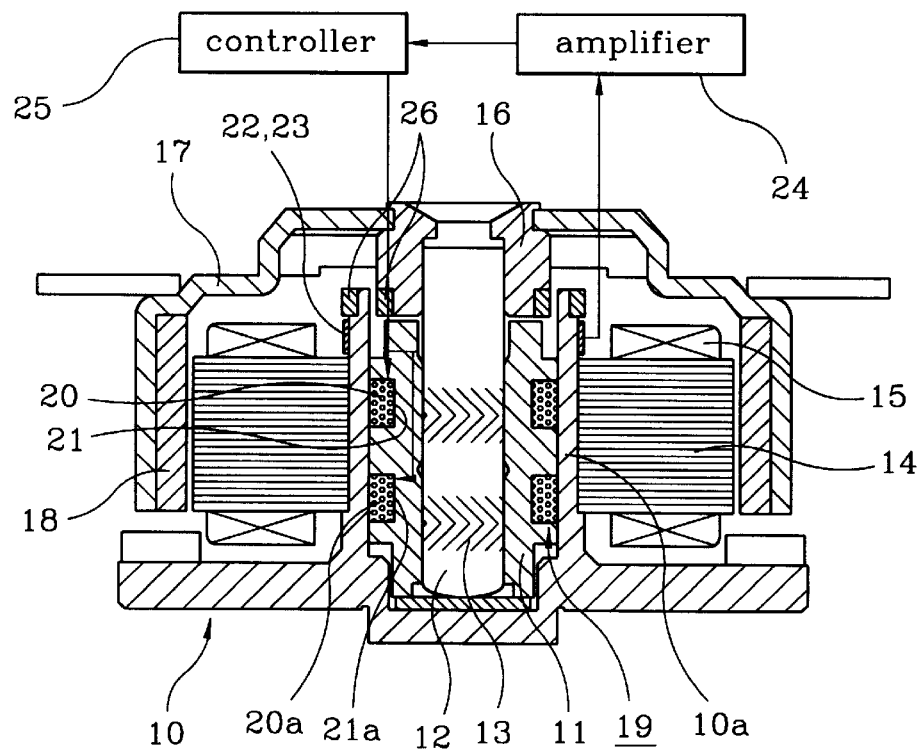
FIG. 6 is a sectional view of a brushless DC motor using an electromagnetic bearing in accordance with the fourth embodiment of the present invention.

FIG. 6 is a sectional view of a brushless DC motor using an electromagnetic bearing in accordance with the fourth embodiment of this invention. In the fourth embodiment, most of the elements are common with those of the third embodiment. Those elements common to both the third and fourth embodiments will thus carry the same reference numerals. In the motor according to the fourth embodiment, a first magnetic force generator 26 is provided on the bottom surface of the rotor holder 16, while a second magnetic force generator 26 is provided on the outer surface of the top end of the base panel's cylindrical holder 10a and cooperates with the first magnetic force generator 26. In order to sense a variable magnetic force generated by the two generators 26, a sensor 22 is provided on the outer surface of the top portion of the above cylindrical holder 10a.

Figure 7:
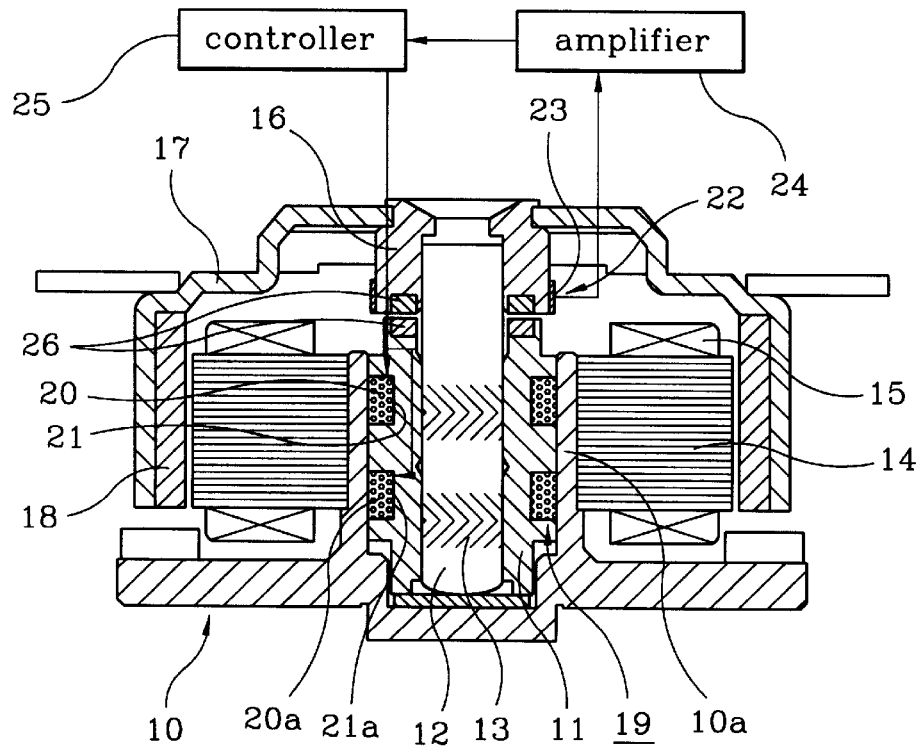
FIG. 7 is a sectional view of a brushless DC motor using an electromagnetic bearing in accordance with the fifth embodiment of the present invention.

FIG. 7 is a sectional view of a brushless DC motor using an electromagnetic bearing in accordance with the fifth embodiment of this invention. In the fifth embodiment, most of the elements are common with those of the third embodiment. Those elements common to both the third and fifth embodiments will thus carry the same reference numerals. In the motor according to the fifth embodiment, a first magnetic force generator 26 is provided on the top surface of the bearing 11, while a second magnetic force generator 26 is provided on the bottom surface of the rotor holder 16 and cooperates with the first magnetic force generator 26. In order to sense a variable magnetic force generated by the two generators 26 and output a sensing signal to a controller 25, a sensor 22 is provided on the outer surface of the rotor holder 16.

Figure 8:
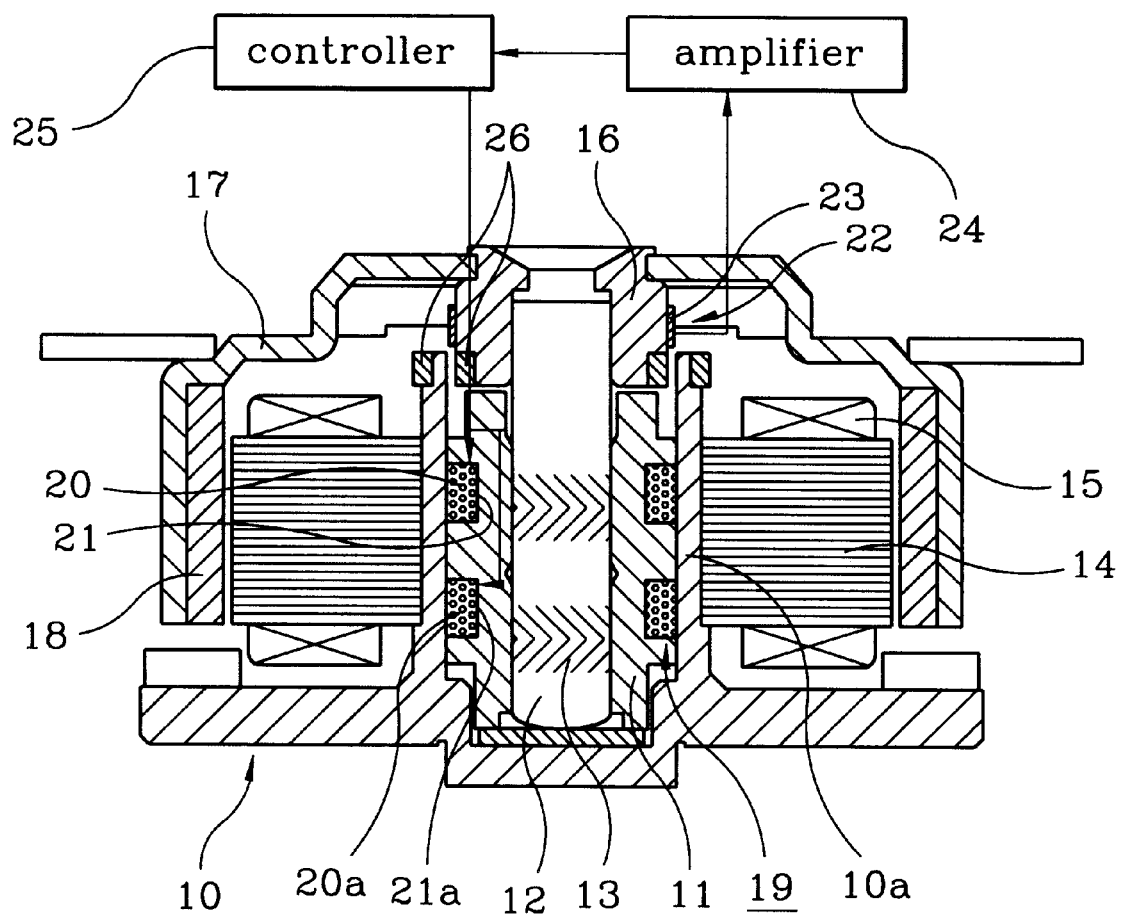
FIG. 8 is a sectional view of a brushless DC motor using an electromagnetic bearing in accordance with the sixth embodiment of the present invention.

FIG. 8 is a sectional view of a brushless DC motor using an electromagnetic bearing in accordance with the sixth embodiment of this invention. In the sixth embodiment, most of the elements are common with those of the third embodiment. Those elements common to both the third and sixth embodiments will thus carry the same reference numerals. In the motor according to the sixth embodiment, a first magnetic force generator 26 is provided on the top surface of the base panel's cylindrical holder 10a, while a second magnetic force generator 26 is provided on the outer surface of the rotor holder's bottom portion and cooperates with the first magnetic force generator 26. In order to sense a variable magnetic force generated by the two generators 26, a sensor 22 is provided on the outer surface of the rotor holder 16.

Each of the motors according to the fourth to sixth embodiments provides the same operational effect as that described for the third embodiment and further explanation is thus not deemed necessary.

As described above, the present invention provides a brushless DC motor suitable for use in office machines. In the brushless DC motor, an axial vibration limit unit is provided on the outer surface of the bearing and electromagnetically and downwardly attracts the rotor, thus preventing the rotor from being centrifugally lifted during a high speed rotation of the rotor. In the operation of the motor, an axial displacement of the rotor is sensed by an induction coil of a sensor. The induction coil generates a variable induction current indicative of an axial displacement of the rotor, and outputs the current to a controller through an amplifier, thus allowing the axial vibration limit unit to be controlled under the control of the controller. The electromagnetic bearing of this invention thus supports the shaft and rotor in an axial direction and almost completely prevents any axial vibrations of the rotor during a rotation of the rotor, thereby reducing operational vibrations and noises of the motor during a high speed operation of the brushless DC motor and improving the axial dynamic characteristics of such a motor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A brushless DC motor, comprising:
    a stator with a coil;
    a rotatable shaft acting as a rotating shaft of said motor;
    a rotor, comprising:
        a cylindrical sidewall portion coaxially coupled to said shaft and coaxially surrounding said stator;
        a rotor holder coaxially coupling the cylindrical sidewall portion to a top end portion of said shaft;
        a magnet attached to the inner surface of said cylindrical sidewall portion and positioned around the stator while forming an air gap between the stator and the magnet; and
        a first magnetic force generator provided on a lower portion of said rotor holder;
    a base panel used as a holding panel for said stator;
    a bearing system, comprising:
        an inner wall interiorly and rotatably holding the shaft with an oil gap being defined between the shaft and the inner wall;
        an outer wall surrounding said inner wall and being used as a holding surface of the bearing system;
        a second magnetic force generator provided at a position proximate the rotor holder and cooperating with said first magnetic force generator of the rotor for producing a magnetic force;
        a sensor for sensing said magnetic force generated by the first and second magnetic force generators;
        at least one vibration limit unit for selectively generating an electromagnetic force so as to prevent the rotor from axially moving during rotation of said rotor, said vibration limit unit being positioned at an intermediate portion between said inner and outer walls; and
        top and bottom walls integrating the inner and outer walls into a single structure at the top and bottom ends of the inner and outer walls; and
        a controller for controlling said limit unit in response to a signal output from said sensor of the bearing system.

2. The brushless DC motor according to claim 1, wherein the number of said vibration limit units is two or more, the two or more vibration limit units being positioned at axially spaced positions.

3. The brushless DC motor according to claim 1, further comprising an amplifier connected between said sensor and said controller.

4. The brushless DC motor according to claim 3, wherein the number of said vibration limit units is two or more, the two or more vibration limit units being positioned at axially spaced positions.

5. The brushless DC motor according to claim 1, wherein said vibration limit unit includes a coil which is energized in response to a signal from said controller and causes said holder to act as an electromagnet to produce said electromagnetic force which acts on the rotor holder to apply magnetic attraction force on the rotor holder to prevent axial movement of the rotor away from the stator.

6. A brushless DC motor, comprising:
    a stator with a coil;
    a rotatable shaft acting as a rotating shaft of said motor;
    a rotor, comprising:
        a cylindrical sidewall portion coaxially coupled to said shaft and coaxially surrounding said stator;
        a rotor holder coaxially coupling the cylindrical sidewall portion to a top end portion of said shaft;
        a magnet attached to the inner surface of said cylindrical sidewall portion and positioned around the stator while forming an air gap between the stator and the magnet; and
        a first magnetic force generator provided on a lower portion of said rotor holder;
    a base panel, comprising:
        a cylindrical holder for supporting said stator;
        a second magnetic force generator provided at a position proximate the rotor holder and cooperating with said first magnetic force generator of the rotor for producing a magnetic force; and
        a sensor for sensing said magnetic force generated by the first and second magnetic force generators;
    a bearing system, comprising:
        an inner wall interiorly and rotatably holding the shaft with an oil gap being defined between the shaft and the inner wall;
        an outer wall surrounding said inner wall and being used as a holding surface of the bearing system;
        at least one vibration limit unit for selectively generating an electromagnetic force so as to prevent the rotor from axially moving during rotation of said rotor, said vibration limit unit being positioned at an intermediate portion between said inner and outer walls; and
        top and bottom walls integrating the inner and outer walls into a single structure at the top and bottom ends of the inner and outer walls; and
        a controller for controlling said limit unit in response to a signal output from said sensor of the bearing system.

7. The brushless DC motor according to claim 6, wherein the number of said vibration limit units is two or more, the two or more vibration limit units being positioned at axially spaced positions.

8. The brushless DC motor according to claim 6, further comprising an amplifier connected between said sensor and said controller.

9. The brushless DC motor according to claim 8, wherein the number of said vibration limit units is two or more, the two or more vibration limit units being positioned at axially spaced positions.

10. The brushless DC motor according to claim 6, wherein said vibration limit unit includes a coil which is energized in response to a signal from said controller and causes said holder to act as an electromagnet to produce said electromagnetic force which acts on the rotor holder to apply magnetic attraction force on the rotor holder to prevent axial movement of the rotor away from the stator.

11. A brushless DC motor, comprising:
    a stator with a coil;
    a base panel used as a holding panel for said stator;
    a rotatable shaft acting as a rotating shaft of a rotor of said motor;
    a bearing system, comprising:
        an inner wall interiorly and rotatably holding the shaft with an oil gap being defined between the shaft and the inner wall;
        an outer wall surrounding said inner wall and being used as a holding surface of the bearing system;
        at least one vibration limit unit for selectively generating an electromagnetic force so as to prevent the rotor from axially moving during rotation of said rotor, said vibration limit unit being positioned at an intermediate portion between said inner and outer walls;

a first magnetic force generator provided on an upper portion of said bearing system; and top and bottom walls integrating the inner and outer walls into a single structure at the top and bottom ends of the inner and outer walls; and said rotor, comprising:

a cylindrical sidewall portion coaxially coupled to said shaft and coaxially surrounding said stator;

a rotor holder coaxially coupling the cylindrical sidewall portion to a top end portion of said shaft;

a magnet attached to the inner surface of said cylindrical sidewall portion and positioned around the stator while forming an air gap between the stator and the magnet; and a second magnetic force generator provided at a position proximate the first magnetic force generator of the rotor and cooperating with said first magnet force generator for producing a magnetic force;

a sensor for sensing said magnetic force generated by the first and second magnetic force generators; and a controller for controlling said limit unit in response to a signal output from said sensor of the bearing system.

12. The brushless DC motor according to claim 11, wherein the number of said vibration limit units is two or more, the two or more vibration limit units being positioned at axially spaced positions.

13. The brushless DC motor according to claim 11, further comprising an amplifier connected between said sensor and said controller.

14. The brushless DC motor according to claim 13, wherein the number of said vibration limit units is two or more, the two or more vibration limit units being positioned at axially spaced positions.

15. The brushless DC motor according to claim 14, wherein said vibration limit unit includes a coil which is energized in response to a signal from said controller and causes said holder to act as an electromagnet to produce said electromagnetic force which acts on the rotor holder to apply magnetic attraction force on the rotor holder to prevent axial movement of the rotor away from the stator.

16. The brushless DC motor according to claim 11, wherein said vibration limit unit includes a coil which is energized in response to a signal from said controller and causes said holder to act as an electromagnet to produce said electromagnetic force which acts on the rotor holder to apply magnetic attraction force on the rotor holder to prevent axial movement of the rotor away from the stator.

17. A brushless DC motor, comprising:

a stator with a coil;

a base panel used as a holding panel for said stator and having a first magnetic force generator;

a rotatable shaft acting as a rotating shaft of a rotor of said motor;

a bearing system, comprising:

an inner wall interiorly and rotatably holding the shaft with an oil gap being defined between the shaft and the inner wall;

an outer wall surrounding said inner wall and being used as a holding surface of the bearing system;

at least one vibration limit unit for selectively generating an electromagnetic force so as to prevent the rotor from axially moving during rotation of said rotor, said vibration limit unit being positioned at an intermediate portion between said inner and outer walls;

top and bottom walls integrating the inner and outer walls into a single structure at the top and bottom ends of the inner and outer walls; and said rotor, comprising:

a cylindrical sidewall portion coaxially coupled to said shaft and coaxially surrounding said stator;

a rotor holder coaxially coupling the cylindrical sidewall portion to a top end portion of said shaft;

a magnet attached to the inner surface of said cylindrical sidewall portion and positioned around the stator while forming an air gap between the stator and the magnet;

a first magnetic force generator provided on the bearing system, a second magnetic force generator provided at a position proximate the first magnetic force generator of the rotor and cooperating with said first magnet force generator for producing a magnetic force;

a sensor for sensing said magnetic force generated by the first and second magnetic force generators; and a controller for controlling said limit unit in response to a signal output from said sensor of the bearing system.

18. The brushless DC motor according to claim 17, wherein the number of said vibration limit units is two or more, the two or more vibration limit units being positioned at axially spaced positions.

19. The brushless DC motor according to claim 17, further comprising an amplifier connected between said sensor and said controller.

20. The brushless DC motor according to claim 19, wherein the number of said vibration limit units is two or more, the two or more vibration limit units being positioned at axially spaced positions.

* * * * *